Nov. 23, 1926.
W. A. BAILEY
GEAR
Filed March 10, 1925
1,608,050
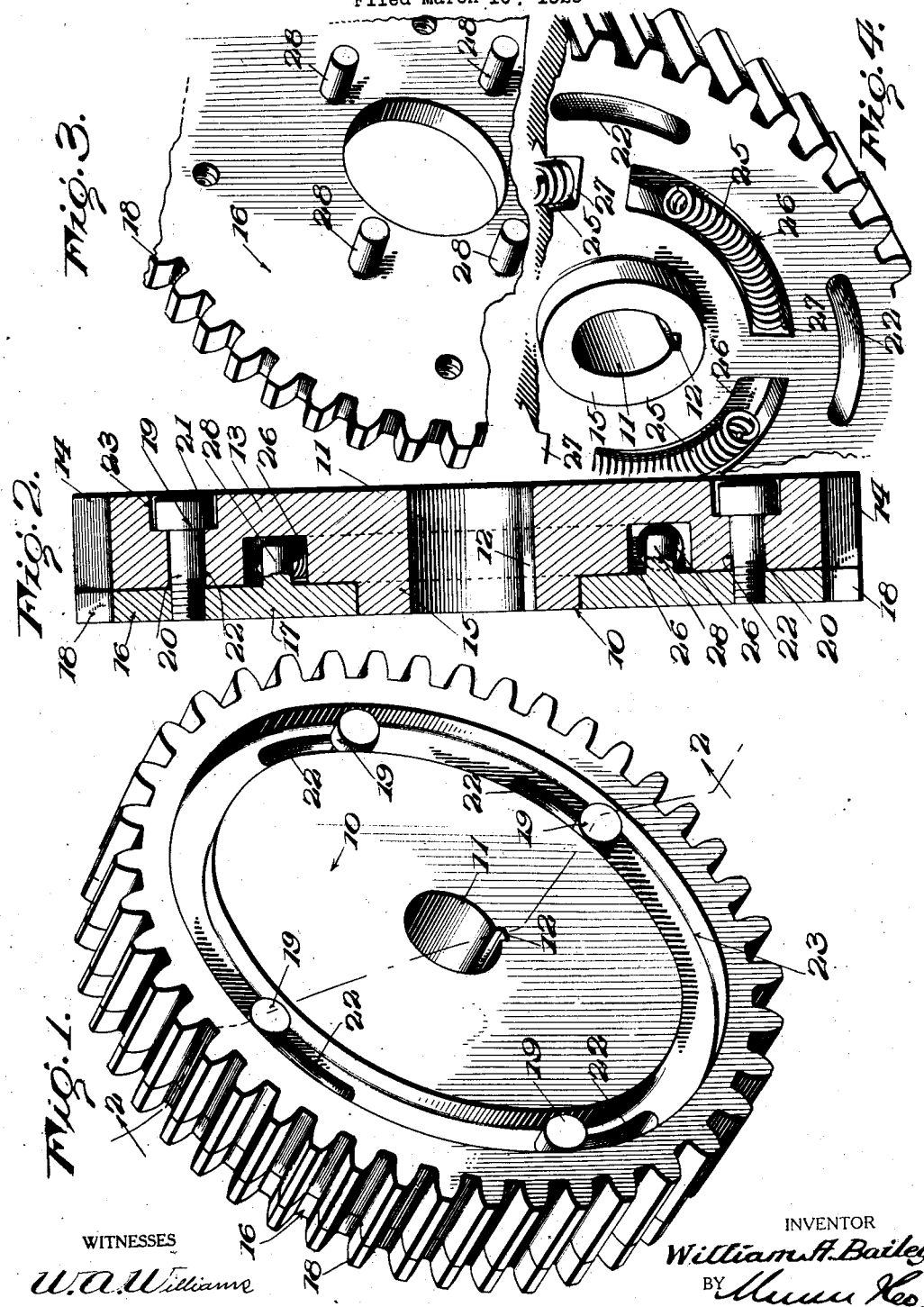

Patented Nov. 23, 1926.

1,608,050

UNITED STATES PATENT OFFICE.

WILLIAM A. BAILEY, OF AMERICAN FORK, UTAH.

GEAR.

Application filed March 10, 1925. Serial No. 14,530.

This invention relates in general to gears and more particularly to an improvement in timing gears.

The object of the invention is the provision of a timing gear which is noiseless and which possesses features of adjustment, the timing gear being adapted for embodiment in practically all sizes and being susceptible of application to gas engines and various other types of machinery.

Other objects and advantages reside in certain novel features of the construction, arrangement and combination of parts which will be hereinafter more fully described and particularly pointed out in the appended claims, reference being had to the accompanying drawings forming part of this specification, and in which:

Figure 1 is a perspective view showing one embodiment of the invention,

Figure 2 is a view in section on the line 2—2 of Figure 1,

Figure 3 is a fragmentary perspective view of a portion of the inner face of the spring-tensioned gear section, and Figure 4 is a similar view of the inner face of the main gear section.

Referring to the drawings the numeral 10 designates a main gear section, the main gear section having a hub 11 provided with a key-way 12 whereby it is adapted to be fixed to a shaft or the like. The main gear section 10 also includes the usual gear body 13 and teeth 14 at the periphery of the body. The hub 11 is formed with an annular flange 15 on which a spring-tensioned gear section 16 is rotatably supported for limited rotary movement with respect to the main gear section 10. The spring-tensioning gear section 16 comprises simply a plate-like body portion 17 having peripheral teeth 18.

Means is provided for limiting the relative movement of the spring-tensioned gear section 16 with respect to the main gear section 10 and this means may comprise a plurality of studs, designated generally at 19, the studs having shanks 20 threaded into or otherwise suitably secured to the body portion 17 of the gear section 16 and also having heads 21. The shanks 20 of the studs 19 are received in arcuate slots 22 provided therefor in the body portion 13 of the gear section 10 and these slots 22 register with an annular groove 23 which accommodates the heads 21 of the studs, the groove 23 being formed in one face of the main gear section 10. It is obvious that the studs 19 co-act with the groove 23 and with the slots 22 for the purpose of preventing endwise or axial displacement of the gear sections with respect to each other as well as for the purposes of limiting the relative rotary movement of the gear sections with regard to each other.

Spring means is provided for tensioning the gear section 16 and preferably this spring means comprises a plurality of expansive coil springs 25 which are accommodated in arcuate grooves 26 formed in the inner face of the body portion 13 of the main gear section 10. One end of each coil spring 25 abuts an end wall 27 of the groove 26 in which it is received as illustrated to advantage in Fig. 4. The other end of each coil spring is engaged by a small block or pin 28 which is integrally formed with or suitably connected to the gear section 16. The springs 25 are tensioned so as to resiliently urge the gear section 16 to the position shown in Fig. 1 wherein the studs 19 which are carried by the gear section 16 are engaged with one end wall of the arcuate slots 22. With this arrangement, however, the gear section 16 may be turned in a counter-clockwise direction as viewed in Fig. 1 in order to place this gear section 16 under spring tension. With the section 16 tensioned as found desirable the teeth 14 and 18 are brought into mesh with the teeth of the gear with which they are designed to co-act and in this way the spring tensioned gear 16 takes up the wear and eliminates noise and grind since the springs 25 engage the studs or pins 28 to throw this gear section and its teeth forwardly in the direction of rotation when the gears are at rest and tend to throw the gear section 16 forwardly in the direction of rotation when the engaged gears are in motion.

I claim:

1. A gear including a main section, a spring tensioned section assembled with the main section for relative rotary movement with respect thereto, spring means for applying a spring tension to the spring tensioned sections and comprising pins carried by the spring tensioned section, said main section having arcuate grooves opening out through its inner face and receiving said pins, the grooves having closed bottoms spaced from the outer face of the main section, coiled springs positioned in said grooves and engaging said pins, and separate means for limiting the relative rotary movement of the sections and for preventing axial displacement of the sections relative to each other.

2. A gear including a main section having a hub projecting from one side thereof, a spring tensioned section rotatably mounted on said hub in face to face relation to the main section, a plurality of studs having shanks secured to the spring tensioned sections and also having heads, said main section having arcuate slots accommodating the shanks of the studs and also having an annular groove receiving the heads of the studs, said main section having arcuate grooves spaced from the annular groove, said arcuate grooves opening through the face of the main section that lies adjacent the spring tensioned section and having closed bottoms spaced from the opposite face of the main section, coil springs fitted in said arcuate grooves, and means carried by the main section and projecting into the arcuate grooves and engaging the springs.

WILLIAM A. BAILEY.